(No Model.)
L. SCHULTZ.
MECHANICAL MOVEMENT.
No. 330,156.  Patented Nov. 10, 1885.
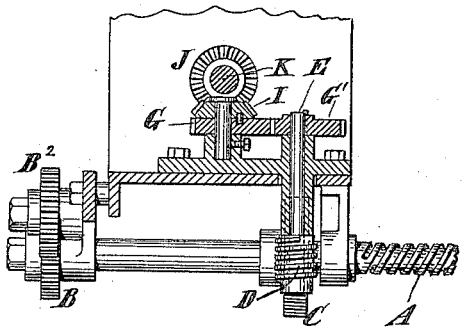
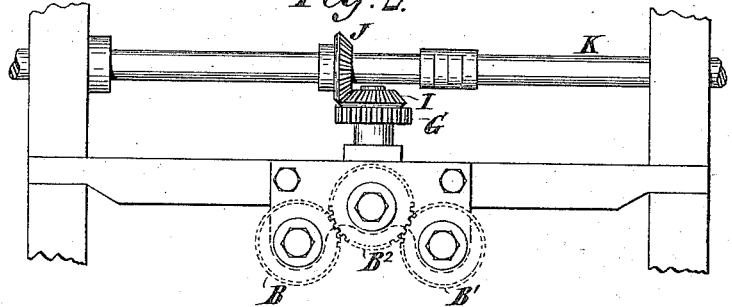
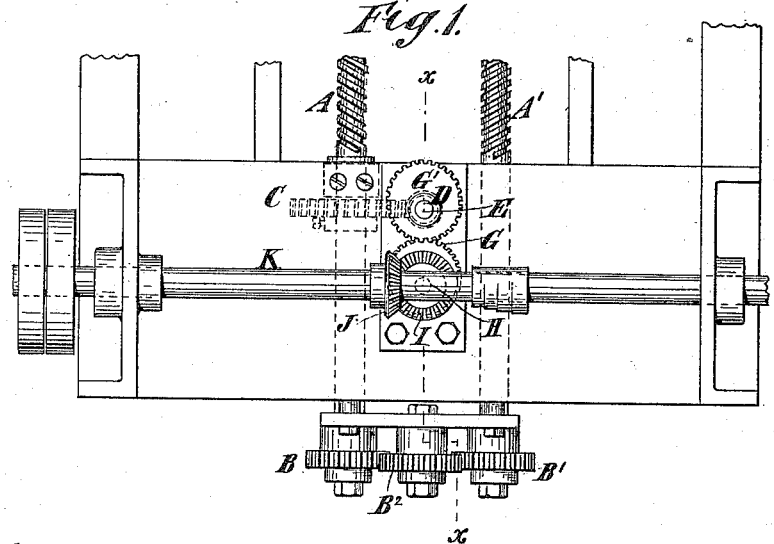

UNITED STATES PATENT OFFICE.

LOUIS SCHULTZ, OF NEW YORK, N. Y.

MECHANICAL MOVEMENT.

SPECIFICATION forming part of Letters Patent No. 330,156, dated November 10, 1885.

Application filed September 3, 1885. Serial No. 176,068. (No model.)

*To all whom it may concern:*

Be it known that I, LOUIS SCHULTZ, of New York, in the county of New York and State of New York, have invented a certain new and useful Improvement in Mechanical Movements, particularly applicable to quilting-machines, of which the following is a specification.

My present improvement relates to a mechanical movement for which United States Letters Patent No. 288,497 were granted to me on the 13th day of November, 1883. That mechanical movement was particularly devised for moving the work-supporting carriage of a quilting-machine or a like object alternately in opposite directions. In that mechanical movement I employ two screws, which are either similarly threaded and rotate in reverse directions or are reversely threaded and rotate in the same direction, and I combine with these screws a beam provided at the ends with nuts and attached to the carriage or other object to be moved, so as to be adapted to be rocked to engage either nut with a corresponding screw. The beam is made to rock automatically. When it engages with one screw, the carriage or other object to be moved is propelled in one direction, and when it engages with the other screw the carriage travels in the reverse direction.

My present improvement consists in a novel combination of parts for imparting motion to the screws, whereby the carriage or other object to be moved is propelled.

In the accompanying drawings, Figure 1 is a plan of a mechanism embodying my improvement. Fig. 2 is an end view of the same. Fig. 3 is a vertical section of the same, taken as indicated by the dotted line $x\ x$, Fig. 1.

Similar letters of reference designate corresponding parts in all the figures.

A A' designate two reversely-threaded screws, having affixed to them at one end gear-wheels B B', that engage with an intermediate gear-wheel, $B^2$. These gear-wheels cause the two screws to rotate in unison and in the same direction. Obviously the two screws might be engaged directly together by gear-wheels B B', affixed to their ends, and the gear-wheel $B^2$ may be omitted. Then the screws will rotate in opposite directions, and hence they may be screw-threaded in the same direction. There is to be a rocking beam attached to the carriage or other object to be moved, and provided at the end with nuts which, one at a time, will engage with one of the screws. The screw A has affixed to it a worm gear-wheel, C, which engages with and derives motion from a worm, D, affixed to an upright shaft, E. The shaft E derives motion through a pair of eccentric gear-wheels, G G', one of which is affixed to it and the other of which is arranged upon a shaft, H.

A bevel-wheel, I, is affixed to the gear-wheel G, and the two rotate together. The bevel-wheel I engages with a bevel-wheel, J, which is affixed to a driving-shaft, K. This shaft may be driven by a belt on one of several pulleys affixed to the shaft.

The gears G G', interposed between the driving-shaft K and the screws A A', cause the latter to rotate alternately with a rapid and a slow motion or dwell. The slow motions will be so timed that they will occur at the times of the descent of the needles of the quilting-machine into the work to be quilted.

What I claim as my invention, and desire to secure by Letters Patent, is—

The combination, with two screws for producing the feed of a carriage or like object, of a driving-shaft for imparting motion thereto, and eccentric gear-wheels arranged intermediate of the driving-shaft and the said screws, substantially as and for the purpose specified.

LOUIS SCHULTZ.

Witnesses:
   WM. G. LIPSEY,
   JOS. R. BOWEN.